United States Patent
Sugashima et al.

(10) Patent No.: US 10,735,435 B2
(45) Date of Patent: Aug. 4, 2020

(54) COMMUNICATION SYSTEM, MANAGEMENT NODE, NORMAL NODE, COUNTER SYNCHRONIZATION METHOD, AND STORAGE MEDIUM

(71) Applicant: DENSO CORPORATION, Kariya, Aichi-pref. (JP)

(72) Inventors: Takeshi Sugashima, Kariya (JP); Akira Komedani, Kariya (JP)

(73) Assignee: DENSO CORPORATION, Kariya (JP)

( * ) Notice: Subject to any disclaimer, the term of this patent is extended or adjusted under 35 U.S.C. 154(b) by 237 days.

(21) Appl. No.: 15/747,261

(22) PCT Filed: Aug. 4, 2016

(86) PCT No.: PCT/JP2016/072877
§ 371 (c)(1),
(2) Date: Jan. 24, 2018

(87) PCT Pub. No.: WO2017/026361
PCT Pub. Date: Feb. 16, 2017

(65) Prior Publication Data
US 2018/0219872 A1    Aug. 2, 2018

(30) Foreign Application Priority Data

Aug. 7, 2015   (JP) .................................. 2015-157234
Jul. 29, 2016   (JP) .................................. 2016-149956

(51) Int. Cl.
*H04L 29/06*    (2006.01)
*H04L 9/12*      (2006.01)
(Continued)

(52) U.S. Cl.
CPC .......... *H04L 63/123* (2013.01); *B60R 16/023* (2013.01); *H04L 9/12* (2013.01); *H04L 9/3242* (2013.01); *H04L 63/08* (2013.01)

(58) Field of Classification Search
CPC ....... H04L 63/123; H04L 9/12; H04L 9/3242; H04L 63/08; H04L 29/06; H04L 9/32; B60R 16/023; G06F 1/12
See application file for complete search history.

(56) References Cited

U.S. PATENT DOCUMENTS 10,474,809 B1 *   11/2019   Wurmfeld ............. H04L 9/0643
10,554,411 B1 *   2/2020    Ashfield ................ H04L 9/3228
(Continued)

FOREIGN PATENT DOCUMENTS

JP   05-091108 A   4/1993
JP   2013-048374 A   3/2013

OTHER PUBLICATIONS

AUTOSAR, "Specification of Module Secure Onboard Communication", AUTOSAR CP Release 4.3.0, Nov. 30, 2016, pp. 1-133.

*Primary Examiner* — Jayesh M Jhaveri
(74) *Attorney, Agent, or Firm* — Posz Law Group, PLC

(57) ABSTRACT

In a communication system, a management node includes: a high-order count value holding unit holding a high-order count value; and a high-order count value distribution unit updating the high-order count value under a high-order update condition and distributing the updated high-order count value to normal nodes. In the communication system, a normal node includes: a count value holding unit holding a count value; a low-order update unit updating a low-order count value held in the count value holding unit under a low-order update condition; and a high-order update unit updating a high-order count value held in the count value holding unit to the high-order count value distributed from the management node together with a reset of the low-order count value.

19 Claims, 11 Drawing Sheets

(51) Int. Cl.
*H04L 9/32* (2006.01)
*B60R 16/023* (2006.01)

(56) References Cited

U.S. PATENT DOCUMENTS

| | | | |
|---|---|---|---|
| 2008/0044014 A1* | 2/2008 | Corndorf | H04L 9/3242 |
| | | | 380/37 |
| 2014/0270163 A1* | 9/2014 | Merchan | H04L 9/0637 |
| | | | 380/46 |
| 2014/0310530 A1 | 10/2014 | Oguma et al. | |
| 2016/0264071 A1* | 9/2016 | Ujiie | B60R 16/023 |
| 2017/0153661 A1* | 6/2017 | Kamiyama | G06F 1/12 |
| 2017/0171169 A1* | 6/2017 | Lee | H04L 9/12 |

* cited by examiner

COMMUNICATION SYSTEM, MANAGEMENT NODE, NORMAL NODE, COUNTER SYNCHRONIZATION METHOD, AND STORAGE MEDIUM

CROSS REFERENCE TO RELATED APPLICATIONS

This application is a U.S. national stage application of International Application No. PCT/JP2016/072877 filed on Aug. 4, 2016 and is based on Japanese Patent Application No. 2015-157234 filed on Aug. 7, 2015, and Japanese Patent Application No. 2016-149956 filed on Jul. 29, 2016, the disclosures of which are incorporated herein by reference.

TECHNICAL FIELD

The present disclosure relates to a communication system, a management node and a normal node included in the communication system, a counter synchronization method of the communication system, and storage mediums storing the programs related to the management node and the normal node included in the communication system.

BACKGROUND

A technique to provide an in-vehicle network with more robust message authentication against a replay attack has been proposed (see Patent Literature 1). Robustness is increased by counting the number of times a message is transmitted for each message identifier (hereinafter, referred to as CANID) in a CAN protocol, and by using a count value to generate a message authentication code (hereinafter, abbreviated to a MAC) in each ECU. CAN is registered trademark.

PATENT LITERATURE

Patent Literature 1: JP 2013-98719 A

SUMMARY

A counter is made up of a large number of bits in order to extend a cycle period sufficiently long. Hence, the ECU managing a count value for each CANID has to manage a massive amount of data, and a memory size and a resource, such as a non-volatile memory, need to be increased to store the massive amount of data.

In the related art, in a case where a message is missed for some reason, for example, when a gateway decimates messages, a discrepancy occurs between count values at a transmitter and a receiver and MAC verification ends with a failure. In such a case, adjusting of the count values at the transmitter and the receiver to be equal to with one other, so-called resynchronization needs to be performed. Because resynchronization also has to be performed for each CANID, when a counter discrepancy occurs among multiple ECUs, a large number of resynchronization data packets flow on the network. This will increase a communication traffic.

In view of the foregoing difficulties, it is an object of the present disclosure to provide a communication system which can reduce management burden of a counter in each node and communication traffic required for count value resynchronization. It is also an object of the present disclosure to provide a management node and a normal node included in the communication system, a counter synchronization method of the communication system, and storage mediums storing the programs related to the management node and the normal node included in the communication system.

According to an aspect of the present disclosure, a communication system includes multiple nodes that are interconnected. Each of the nodes generates a message authentication code with a count value of an own counter and verifies a message transceived among the nodes using the message authentication code. The multiple nodes include a management node and a normal node. The normal node transmits and receives the message. When the count value in each of the nodes is divided into two segments, one segment on a high order side is defined as a high-order count value and a remaining segment on a low order side is defined as a low-order count value.

The management node includes a high-order count value holding unit, a high-order count value update unit, and a high-order count value distribution unit. The high-order count value holding unit holds the high-order count value. The high-order count value update unit updates the high-order count value under a preliminarily set high-order update condition. The high-order count value distribution unit distributes the high-order count value held in the high-order count value holding unit to the normal node under a preliminarily set distribution condition.

The normal node includes a count value holding unit, a low-order update unit, a high-order update unit, and a low-order initialization unit. The count value holding unit holds the count value. The low-order update unit updates the low-order count value held in the count value holding unit under a preliminarily set low-order update condition. The high-order update unit updates the high-order count value held in the count value holding unit with the high-order count value distributed from the management node. The low-order initialization unit initializes the low-order count value when the high-order count value is updated by the high-order update unit.

With the above configuration, the high-order count values stored in the normal nodes are managed by the management node. When the high-order count value is distributed from the management node, each of the normal nodes stores the distributed high-order count value regardless of the use of message or types of message. Each normal node only manages the low-order count value according to the use of message or type of message. Thus, in the normal node, data amount for storing the count value can be reduced. Thus, non-volatile memory is not required to be included in the normal node. Further, each time the high-order count value is updated by the management node, the low-order count value of the normal node is reset. Thus, a discrepancy between counter value in the transmission end and counter value in the reception end of the message can be restricted. Suppose that a discrepancy occurs between counter value in the transmission end and counter value in the reception end, the resynchronization can be simply carried out by the distribution of the high-order count value from the management node. Thus, communication traffic of the resynchronization can be reduced.

According to another aspect of the present disclosure, a counter synchronization method is provided. The counter synchronization method includes: dividing the count value of the counter of each of the plurality of nodes into two segments, wherein one segment on a high order side is defined as a high-order count value and a remaining one segment on a low order side is defined as a low-order count value; holding, in the management node, the high-order count value of the management node; updating, in the management node, the high-order count value of the management node under a preliminarily set high-order update condition; distributing the high-order count value updated in the management node to the normal nodes under a preliminarily set distribution condition; holding, in each of the normal nodes, the count value of each of the normal nodes; updating, in each of the normal nodes, the low-order count value of each of the normal nodes under a preliminarily set low-order update condition; updating, in each of the normal nodes, the high-order count value with the high-order count value distributed from the management node; and initializing, in each of the normal nodes, the low-order count value when the high-order count value is updated.

With the above-described counter synchronization method, effects similar to the effects provided by the communication system can be provided.

According to another aspect of the present disclosure, a management node included in the above-described communication system can be provided.

According to another aspect of the present disclosure, a normal node included in the above-described communication system can be provided.

Functions of the respective units forming the management node and functions of the respective units forming the normal nodes may be implemented by a program to be executed by a computer. The program may be stored in a ROM or a backup RAM incorporated in the computer, and may be loaded to the computer from the ROM or the backup RAM, or loaded to the computer via a network.

The program may be provided to a user after being recorded in any type of computer-readable, non-transitory tangible storage medium, or provided to a user via an electrical communication line. Examples of the non-transitory tangible storage medium include but not limited to an optical disk, a magnetic disk, or a semiconductor memory, such as a USB memory and a Memory Card (registered trademark).

BRIEF DESCRIPTION OF DRAWINGS

The above and other objects, features and advantages of the present invention will become more apparent from the following detailed description made with reference to the accompanying drawings. In the drawings.

DETAILED DESCRIPTION

Hereinafter, embodiments will be described with reference to the drawings.

1. First Embodiment (1.1. Overall Configuration)

Figure 1:
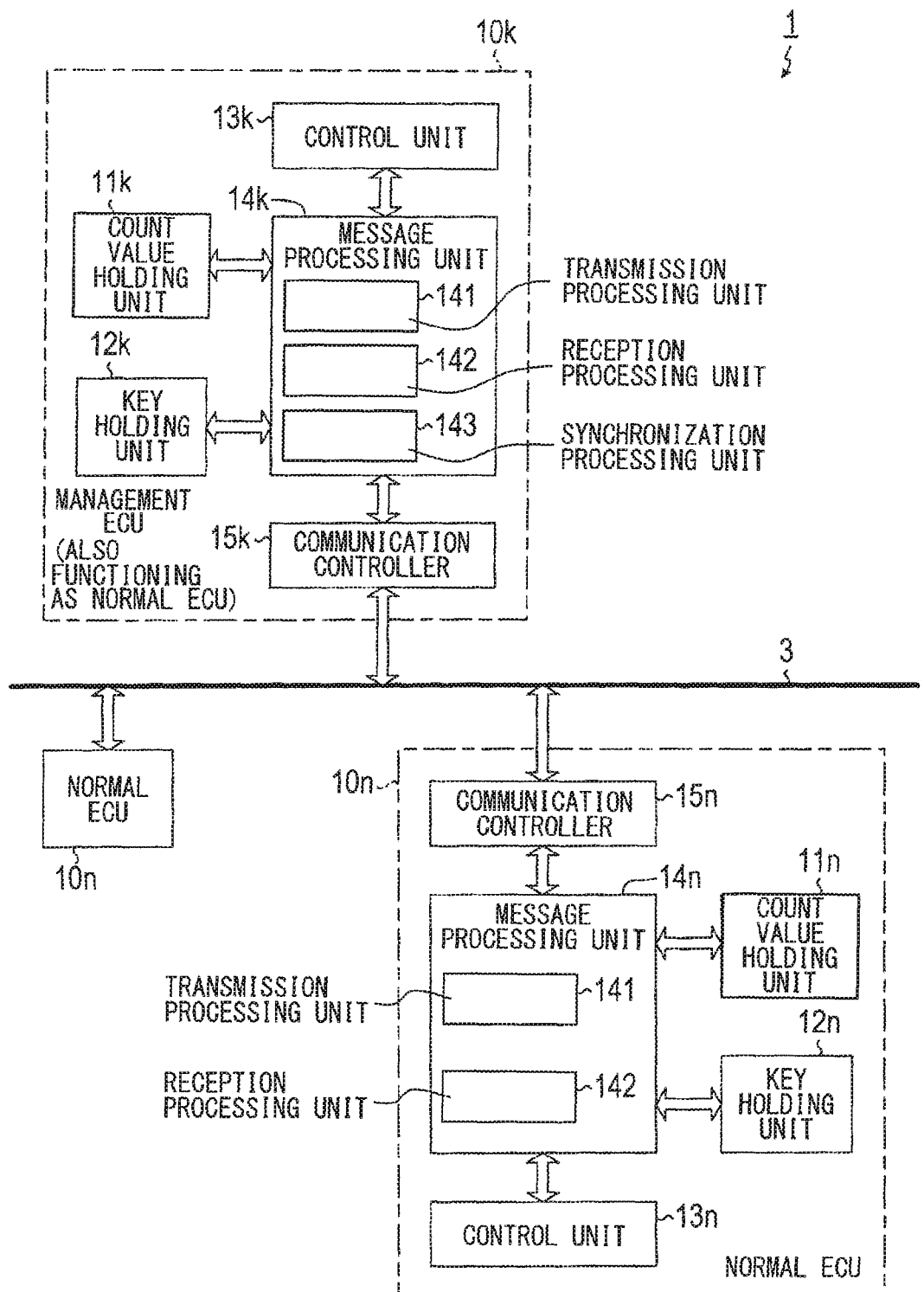
FIG. 1 is a block diagram of an overall configuration of a communication system.

A communication system 1 is mounted to a vehicle, and as is shown in FIG. 1, includes multiple nodes 10 and a bus communication channel 3 interconnecting the nodes 10. An access control method adopted in the communication system 1 is so-called a CSMA-CA method, according to which a node 10 which loses in arbitration on the communication channel 3 stops transmitting a message and only a node 10 which wins in arbitration continues to transmit a message. More specifically, CAN protocol defined under ISO11898 standards is used as the communication protocol, and an arbitration is performed by using an identifier (hereinafter, referred to as a CANID) assigned to a header portion of a frame. CAN is registered trademark.

A node 10 is provided by an electronic control unit (hereinafter, referred to as an ECU for short). Hereinafter, one of the nodes 10 is referred to as a management ECU $10k$ and the rest as normal ECU $10n$. When the former and the latter are not distinguished from each other, the nodes 10 are referred to simply as ECUs 10. The same applies to components forming the management ECU $10k$ and the normal ECU $10n$ described below.

(1.2. Management ECU)

The management ECU $10k$ includes a count value holding unit $11k$, a key holding unit $12k$, a control unit $13k$, a message processing unit $14k$, and a communication controller $15k$.

The communication controller $15k$ includes a known CAN controller. The communication controller $15k$ transmits various messages supplied from the message processing unit $14k$ to the communication channel 3 by using communication frames defined under the CAN protocol. Upon receipt of a communication frame assigned with a CANID defining the own ECU $10k$ as a destination from the communication channel 3, the CAN controller extracts a message from the received frame and supplies the message to the message processing unit $14k$. A communication frame is assigned with a message identifier (CANID) predetermined for a type of message.

The count value holding unit $11k$ includes a readable and writable non-volatile memory. The count value holding unit $11k$ has two storing areas. One area holds a count value of a management counter, and the other holds a count value of a communication counter.

Figure 2:
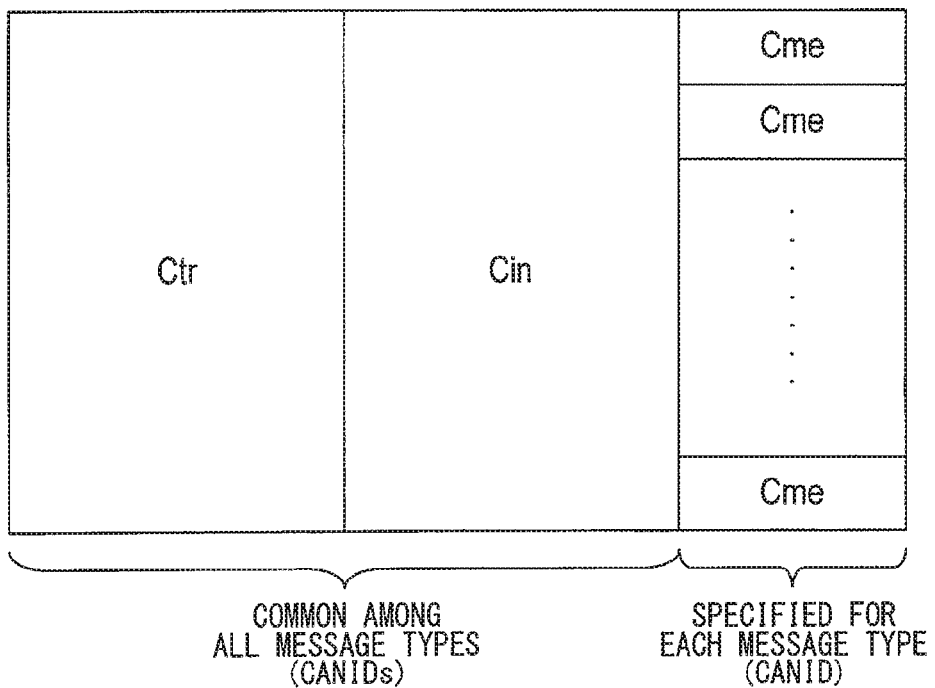
FIG. 2 is a diagram used to describe structures of a basic counter, a counter included in a management ECU, and a counter included in a normal ECU.

As is shown in FIG. 2, a basic counter is made up of a predetermined number of bits used to generate a message authentication code (MAC) described below. Herein, a 64-bit counter is used. The counter is divided into two segments: upper 48 bits and lower 16 bits, and a count value on a high order side is referred to as a high-order count value, and a count value on a low order side is referred to as a low-order count value. The high-order count value is further divided into two 24-bit parts. In the high-order count value, a count value on a high order side is referred to as a trip count value Ctr, and a count value on a low order side is referred to as an interval count value Cin. The low-order count value is referred to also as a message count value Cme.

As is shown in FIG. 2, a count value of the management counter is made up of the high-order count value, that is, the trip count value Ctr and the interval count value Cin. As is shown in FIG. 2, a count value of the communication counter is made up of low-order count values specified for respective CANIDs processed by the own ECU, and a high-order count value provided in common to all types of CANIDs processed by the own ECU. Each ECU 10 is capable of either transmitting or receiving a message for one CANID. Hence, the communication counter provided for each CANID operates as either a communication counter for transmission purpose or a communication counter for reception purpose.

The key holding unit 12k includes a readable and writable non-volatile memory. The key holding unit 12k stores so-called a common key K made up of a predetermine number of bits used to generate a MAC. Herein, a 128-bit common key K is used. The common key K is shared by all ECUs 10 and preliminarily stored in the key holding unit 12k.

The control unit 13k includes a known computer. The control unit 13k performs various types of processing to implement functions preliminarily assigned to the own ECU by communicating with other ECUs 10 via the message processing unit 14k and the communication controller 15k. To perform various types of processing, the control unit 13k exchanges data PDU with the message processing unit 14k.

The message processing unit 14k is mainly formed of a known micro-computer having a CPU, semiconductor memories (hereinafter, referred to simply as the memory), such as a RAM, a ROM, and a flash memory. Various functions of the message processing unit 14k are realized by executing a program stored in a non-transitory tangible storage medium on the CPU. Herein, the memory corresponds to a non-transitory tangible storage medium storing the program. By executing the program, a method corresponding to the program is executed. The message processing unit 14k may be formed of a single micro-computer or multiple micro-computers.

The message processing unit 14k includes a transmission processing unit 141, a reception processing unit 142, and a synchronization processing unit 143 as functional blocks that are implemented by execution of the program on the CPU. The transmission processing unit 141 performs processing to transmit a message to other ECUs 10. The reception processing unit 142 performs processing to receive a message from other ECUs 10. The synchronization processing unit 143 performs processing to synchronize counter values used to generate and verify MACs assigned to messages at an end of the respective ECUs 10. The foregoing processing will be described more in detail below.

(1.3. Normal ECU)

Similar to the management ECU 10k, the normal ECU 10n includes a count value holding unit 11n, a key holding unit 12n, a control unit 13n, a message processing unit 14n, and a communication controller 15n. The key holding unit 12n, the control unit 13n, and the communication controller 15n are same, respectively, as the key holding unit 12k, the control unit 13k, and the communication controller 15k of the management ECU 10k, and a description is omitted herein.

The count value holding unit 11n includes a memory storing a count value of the communication counter. Unlike the count value holding unit 11k of the management node 10k, the memory is not necessarily a non-volatile memory. A detail of a count value of the communication counter is same as a count value held in the count value holding unit 11k shown in FIG. 2.

The message processing unit 14n includes a transmission processing unit 141 and a reception processing unit 142 which are same as the counterparts in the message processing unit 14k.

That is, a normal ECU 10n is of the configuration of the management ECU 10k, from which a configuration (the management counter and the synchronization processing unit 143) relating to a management function of the management ECU 10k is omitted. In other words, the management ECU 10k includes the functions of the normal ECUs 10n and is capable of functioning also as a normal ECU 10n.

(1.4. Message Processing Unit)

Figure 3:
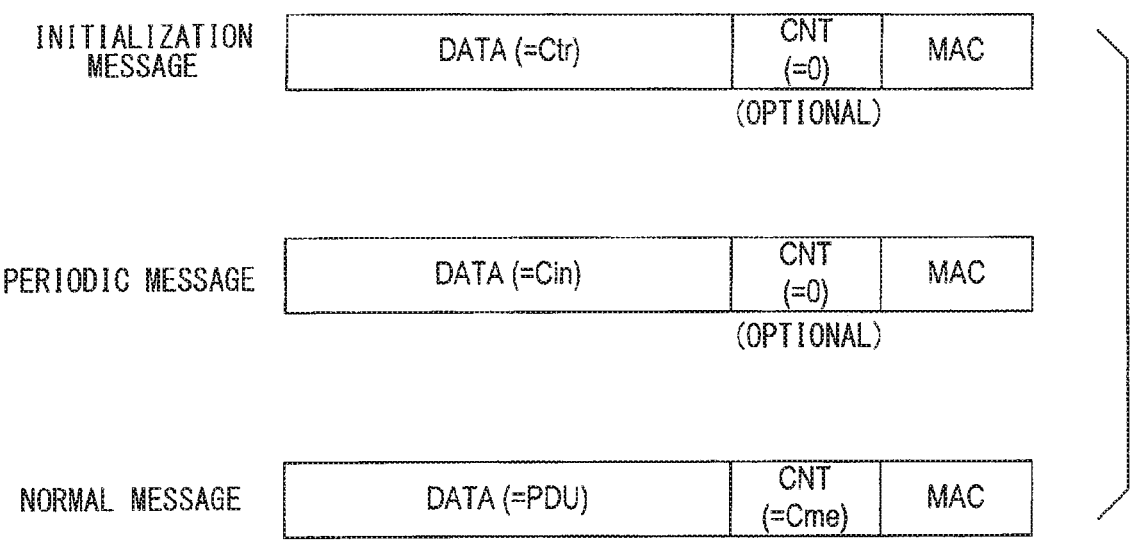
FIG. 3 is a diagram showing structures of an initialization message and a periodic message transmitted from the management ECU and received at the normal ECUs, and a normal message transmitted and received among normal ECUs.

FIG. 3 shows messages processed by the message processing unit 14. A message includes a DATA field, a CNT field, and a MAC field. Messages include an initialization message and a periodic message used for distribution from the management ECU 10k to the normal ECUs 10n, and a normal message used for communications among the normal ECUs 10n.

As is shown in FIG. 3, the initialization message includes the DATA field where the trip count value Ctr is stored, the CNT field where 0 is stored, and the MAC field where a part of a MAC generated by using information in the DATA field is stored. The inverter count value Cin may be included in the DATA field.

As is shown in FIG. 3, the periodic message includes the DATA field where the interval count value Cin is stored, the CNT field where 0 is stored, and the MAC field where a part of a MAC generated by using information in the DATA field is stored.

As is shown in FIG. 3, the normal message includes the DATA field where data PDU is stored, the CNT field where the message count value Cme is stored, and the MAC field where a part of a MAC generated by using information in the DATA field and the CNT field is stored.

The CNT field may be omitted from the initialization message and the periodic message.

Figure 4:
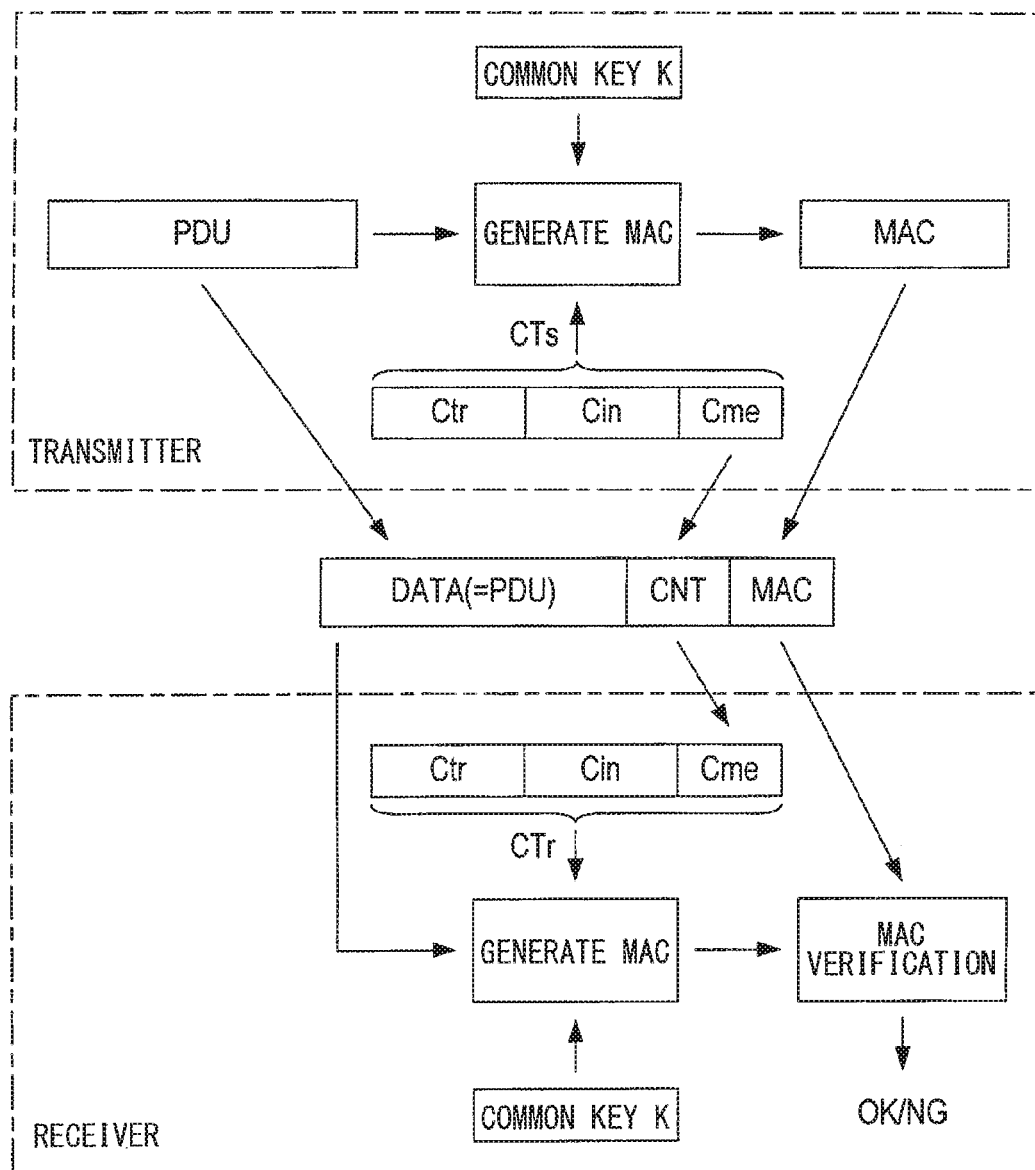
FIG. 4 is a diagram showing an outline of processing executed by a transmitter ECU which transmits a message and a receiver ECU which receives the message.

An outline of processing performed by the message processing unit 14 when transmitting and receiving the normal message will now be described using FIG. 4.

A transmitter ECU 10, which transmits a message, generates a MAC by using the data PDU supplied from the control unit 13, the common key K held in the key holding unit 12, and a count value CTs (that is, Ctr, Cin, and Cme) of the communication counter held in the count value holding unit 11. The transmitter ECU 10 then generates a message including the DATA field where the data PDU is stored, the CNT field where the message count value Cme of the transmission counter is stored, and the MAC field where a part of the newly generated MAC is stored, and supplies the message to the communication controller 15.

Meanwhile, a receiver ECU 10 which receives the message via the communication controller 15 generates a MAC by using a value in the DATA field of the message, the common key K held in the key holding unit 12, and a count value CTr made up of the high-order count value (that is, Ctr and Cin) of the communication counter held in the count value holding unit 11 and a value (that is, r_Cme) in the CNT field of the message linked to the high-order count value as the low-order count value. MAC verification is performed by comparing the newly generated MAC with a value in the MAC field of the message. When integrity of the message is confirmed by the verification, that is, when the MAC verification succeeds, the value in the DATA field of the message is supplied to the control unit 13 as the data PDU. When integrity is denied by the verification, that is, when the MAC verification fails, the message is discarded.

When transmitting and receiving the initialization message, the transmitter ECU 10 uses the trip count value Ctr held in the count value holding unit 11 instead of the data PDU. The transmitter ECU 10 generates a MAC by using the trip count value Ctr and the common key K without using the count value CTs of the communication counter. The transmitter ECU 10 then generates an initialization message including the DATA field where the trip count value Ctr is stored and the MAC field where a part of the newly generated MAC is stored (see FIG. 3). The receiver ECU 10 also generates a MAC by using the value in the DATA field and the common key K without using the count value Ctr.

When transmitting and receiving the periodic message, the transmitter ECU 10 and the receiver ECU 10 operate in a same manner as with the initialization message except that the interval count value Cin is used instead of the trip count value Ctr.

(1.4.1. Synchronization Processing Unit)

Figure 5:
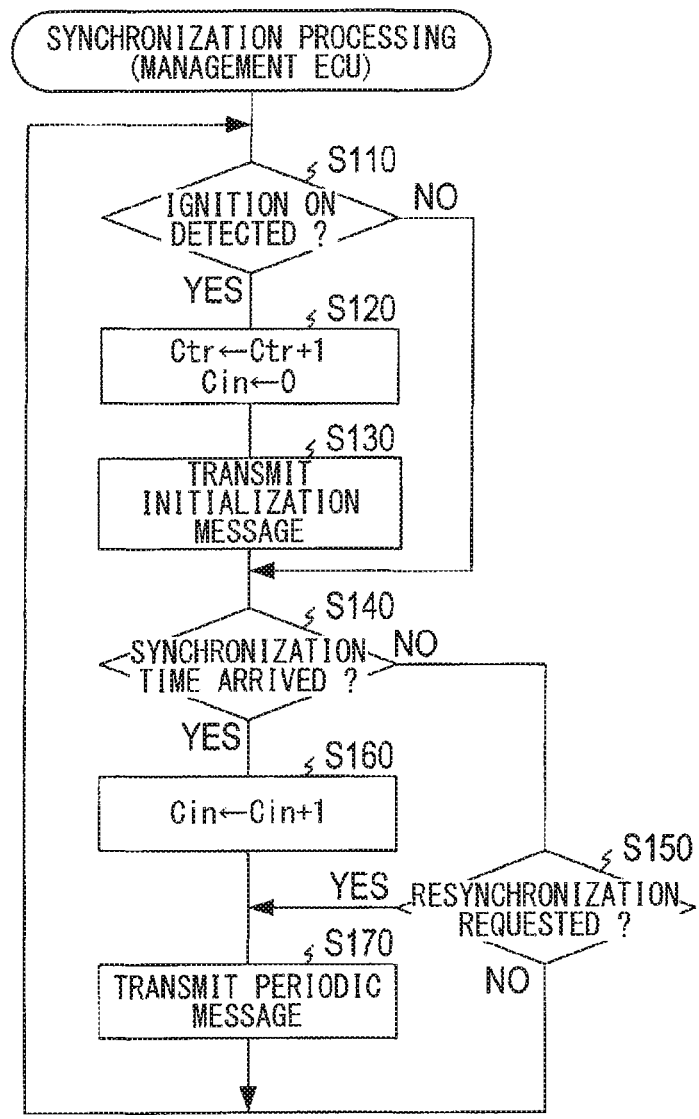
FIG. 5 is a flowchart depicting synchronization processing performed by a message processing unit of the management ECU.

Processing by the synchronization processing unit 143, which is included in processing performed by the message processing unit 14 and performed in the management ECU 10k only, will now be described using a flowchart in FIG. 5. The processing shown in FIG. 5 starts upon activation of the management ECU 10k.

When the synchronization processing unit 143 starts the processing, a determination is made in S110 as to whether an ON-state of an ignition switch of an own vehicle (IG-ON) is detected. When IG-ON is not detected, the flow skips to S140.

In S120, the count value of the management counter stored in the count value holding unit 11k is updated. To be more specific, the trip count value Ctr is incremented by one (Ctr←Ctr+1) while the interval count value Cin is reset to 0.

In subsequent S130, an initialization message is generated by using the trip count value Ctr incremented in S120 and transmitted to the respective ECUs 10.

In subsequent S140, a determination is made as to whether a synchronization time, which is set for every preliminarily set period, is arrived. When the synchronization time arrives, the flow proceeds to S160. When the synchronization time has not yet arrived, the flow proceeds to S150.

In S150, a determination is made as to whether a resynchronization request has been received from a normal ECU 10n. When the resynchronization request has been received, the flow proceeds to S170. When the resynchronization request has not been received, the flow returns to S110.

In S160, the interval count value Cin of the management counter stored in the count value holding unit 11k is incremented (Cin←Cin+1).

In subsequent S170, the synchronization message is generated by using the interval count value Cin and transmitted to the respective ECUs 10. The flow then returns to S110.

That is, the trip count value Ctr of the management counter is updated each time IG-ON is detected. The updated trip count value Ctr is distributed to the respective ECUs 10 by an initialization message.

The interval count value Cin of the management counter is reset to 0 when IG-ON is detected and updated at each arrival of synchronization time. The updated interval count value Cin is distributed to the respective ECUs 10 by the periodic message. The periodic message is also distributed in a same manner when a resynchronization request is received from a normal ECU 10n.

(1.4.2. Transmission Processing Unit)

Figure 6:
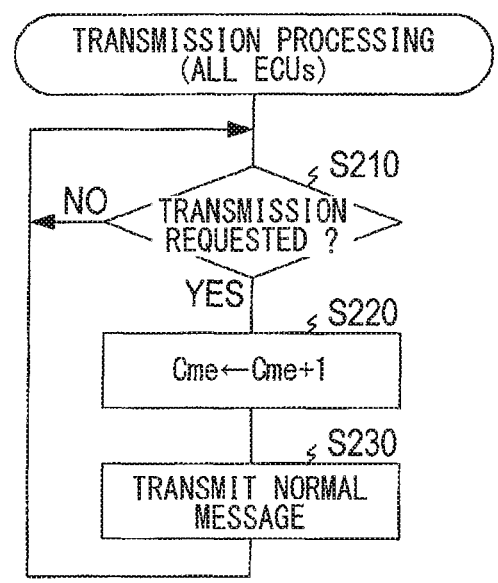
FIG. 6 is a flowchart depicting transmission processing performed by a message processing unit of a normal ECU.

Processing performed by the transmission processing unit 141 of the ECU 10 (that is, a normal ECU 10n and the management ECU 10k furnished with functions of the normal ECUs) will now be described using a flowchart of FIG. 6. The processing shown in FIG. 6 starts upon activation of the ECU 10.

When the processing starts, the transmission processing unit 141 determines in S210 whether a transmission request has been received from the control unit 13. When the transmission request has not been received, the transmission processing unit 141 waits for the transmission request by repeating S210. When the transmission request has been received, the flow proceeds to S220.

In S220, a CANID corresponding to a content of the data PDU supplied from the control unit 13 is identified, and the message count value Cme of the communication counter used with the identified CANID is incremented (Cme←Cme+1).

In subsequent S230, a normal message is generated by using the data PDU supplied from the control unit 13 and the message count value Cme incremented in S220, and transmitted to a receiver ECU 10. The flow then returns to S210.

(1.4.3. Reception Processing Unit)

Processing performed by the reception processing unit 142 of the ECU 10 will now be described using a flowchart of FIG. 7. The processing shown in FIG. 7 starts upon activation of the ECU 10.

When the processing starts, the reception processing unit 142 determines in S310 whether an initialization message has been received. When the initialization message has not been received, the flow proceeds to S320.

In S320, a determination is made as to whether IG-ON of the own vehicle is detected. When IG-ON has not been detected, the flow proceeds to S390. When IG-ON has been detected, the flow proceeds to S330.

In S330, the trip count value Ctr of the communication counter stored in the count value holding unit 11 is incremented (Ctr←Ctr+1). The flow then proceeds to S380.

When it is determined in S310 that the initialization message has been received, the flow proceeds to S340, in which a MAC is generated from a trip count value r_Ctr included in the DATA field of the initialization message and the common key K held in the key holding unit 12, and MAC verification is performed by comparing the newly generated MAC with a value included in the MAC field of the initialization message. When the MAC verification fails, the flow proceeds to S370. When the MAC verification succeeds, the flow proceeds to S350.

In S350, a determination is made as to whether the trip count value r_Ctr included in the DATA field of the initialization message is greater than the trip count value Ctr of the communication counter held in the count value holding unit 11. When r_Ctr>Ctr, the flow proceeds to S360. When r_Ctr≤Ctr, the flow proceeds to S370.

In S360, the trip count value Ctr of the communication counter held in the count value holding unit 11 is updated to the trip count value r_Ctr included in the DATA field. The flow then proceeds to S380.

In S370, it is determined that the received initialization message has an abnormality and preliminarily set error processing is performed.

In S380, the interval count value Cin of the communication counter held in the count value holding unit 11 and the message count values Cme for all the CANIDs are reset to 0.

In short, the count value (except for Ctr) of the communication counter is initialized when an initialization message is properly received or when IG-ON is detected by the processing in S310 through S380.

In subsequent S390, a determination is made as to whether a periodic message has been received. When the periodic message has not been received, the flow proceeds to S400, in which a determination is made as to whether a normal message has been received. When the normal message has not been received, either, the flow returns to S310.

When it is determined in S390 that the periodic message has been received, the flow proceeds to S410, in which a MAC is generated from an interval count value r_Cin included in the DATA field of the received periodic message and the common key K held in the key holding unit 12, and MAC verification is performed by comparing the newly generated MAC with a value included in the MAC field of the periodic message. When the MAC verification fails, the flow proceeds to S440. When the MAC verification succeeds, the flow proceeds to S420.

In S420, a determination is made as to whether the interval count value r_Cin included in the DATA field of the periodic message is greater than the interval count value Cin of the communication counter held in the count value holding unit 11. When r_Cin>Cin, the flow proceeds to S430. When r_Cin≤Cin, the flow proceeds to S440.

In S430, the interval count value Cin of the communication counter held in the count value holding unit 11 is updated to the interval count value r_Cin included in the DATA field of the periodic message while the message count values Cme for all the CANIDs are reset to 0. The flow then returns to S310.

Meanwhile, a resynchronization request is transmitted to the management ECU in S440. The flow then returns to S310.

When it is determined in S400 that the normal message has been received, the flow proceeds to S450.

In S450, a MAC is generated from data r_PDU included in the DATA field of the normal message, the common key K held in the key holding unit 12, and a count value CTr made up of the trip count value Ctr and the interval count value Cin of the communication counter held in the count value holing unit 11 and a message count value r_Cme included in the CNT field of the normal message and linked to the count values Ctr and Cin. Further, MAC verification is performed by comparing the newly generated MAC with a value included in the MAC field of the normal message. When the MAC verification fails, the flow returns to S310. When the MAC verification succeeds, the flow proceeds to S460.

In S460, a determination is made as to whether the message count value r_Cme included in the CNT field of the normal message is greater than the message count value Cme of the communication counter held in the count value holding unit 11. It should be noted that the message count value Cme checked herein is a value which had been counted for the CANID of the received normal message. When r_Cme>Cme, the flow proceeds to S470. When r_Cme≤Cme, the flow returns to S310.

In S470, the message count value Cme of the communication counter held in the count value holding unit 11 is incremented (Cme←Cme+1). The flow then returns to S310 and the DATA field of the normal message is supplied to the control unit 13 as the data PDU at a same time.

In short, the interval count value Cin of the communication counter is updated while the message count value Cme is initialized each time a periodic message is properly received by the processing in S390 through S470. Also, the message count value of the communication counter is updated each time a normal message is properly received.

Respective elements forming the message processing unit 14k, namely the transmission processing unit 141, the reception processing unit 142, and the synchronization processing unit 143 are not necessarily implemented by software, and some or all of the elements may be implemented by a single or multiple hardware components. For example, when functions of the respective units are implemented by electronic circuits which are hardware components, the electronic circuits may be implemented by digital circuits including a large number of logic circuits or analog circuits or a combination of digital and analog circuits.

(1.5. Operation)

The communication system 1 configured as above operates as follows.

Upon detection of IG-ON, the management ECU 10k updates the trip count value Ctr of the management counter, and distributes the updated value to the respective ECUs 10 by an initialization message. At this time, a MAC is assigned to the initialization message.

Upon receipt of the initialization message, the ECU 10 performs MAC verification by checking which of the trip count value r_Ctr included in the initialization message and the trip count value Ctr held in itself is the greater. When the MAC verification succeeds (that is, the message has integrity) and r_Ctr>Ctr, the ECU 10 updates the trip count value Ctr held in itself while initializing the interval count value Cin and the message count value Cme.

Accordingly, count values of the communication counters held in the respective ECUs 10 show a same value and hence the count values at the transmitter's end and the receiver's end are synchronized.

Afterwards, the transmitter ECU 10 and the receiver ECU 10 individually update the message count value Cme of the communication counter for the corresponding CANID and generate and verify MACs by using the updated message count value Cme each time a normal message is transmitted and received.

The management ECU 10k updates the interval count value Cin of the management counter at each arrival of synchronization time which is set for every regular period (for example, every 500 ms), and distributes the updated interval count value Cin to the respective ECUs 10 by a synchronization message. At this time, a MAC is appended to the synchronization message.

Upon receipt of the synchronization message, the ECU 10 performs MAC verification by checking which of the interval count value r_Cin included in the synchronization message and the interval count value Cin held in itself is the greater. When the MAC verification succeeds and r_Cin>Cin, the ECU 10 updates the interval count value Cin held in itself while initializing the message count value Cme.

Accordingly, even when a discrepancy occurs between the count value of the communication counter held in the transmitter ECU and the count value of the communication counter held in the receiver ECU for any CANID, the count values of the communication counters in the both ECUs show the same value, that is, the ECUs at the both ends are restored to a state in which the count values are synchronized by receiving the synchronization message.

(1.6. Effects)

As has been described, in the communication system 1, the communication counter is divided into a high-order count value (the trip count value Ctr and the interval count value Cin) and a low-order count value (the message count value Cme). The management ECU 10k collectively manages the high-order count values, and each ECU 10 updates only the low-order count value and uses a common value distributed from the management ECU 10k as the high-order count value for all types of received messages (that is, all CANIDs).

Hence, as the count value of the communication counter, the ECU 10 holds the low-order count value for each CANID, and holds only a single value used in common with all CANIDs as the high-order count value. Thus, a memory size required to hold the count value of the communication counter can be reduced markedly.

In the communication system 1, the management ECU 10k periodically updates the high-order count value (the interval count value Cin, in particular) and distributes the updated value to the respective ECUs 10. Upon receipt of the distribution, the ECU 10 not only updates the high-order count value but also resets the low-order count value of the communication counter. Hence, the communication system 1 is capable of periodically resynchronizing the count values of the communication counters held in the respective ECUs 10.

Moreover, in the communication system 1, the high-order count value is divided into two parts, and the trip count value Ctr as one part is distributed only in response to a detection of IG-ON while only the interval count value Cin as the other part is transmitted periodically to the respective ECUs 10. Hence, even when a communication system adopts the CAN protocol in which amount of data can be transmitted in a message frame is set to be small, the resynchronization can be executed by transmitting only one synchronization message. Thus, communication traffic during resynchronization can be reduced markedly.

In the communication system 1, the ECU 10 initializes the count value of the communication counter not only when an initialization message is received, but also when IG-ON is detected. Hence, the ECU 10 is capable of starting to transmit and receive a normal message quickly without having to wait for a distribution of an initialization message.

In the communication system 1, the ECU 10 which has received a synchronization message transmits a resynchronization request to the management ECU 10k upon detection of an abnormality in the synchronization message, while the management ECU 10k which has received the resynchronization request transmits the synchronization message again without having to wait for an arrival of the resynchronization time. Hence, the communication system 1 is capable of quickly cancelling a state in which synchronization of the count values of the communication counters is not achieved.

In the communication system 1, the ECU 10 which has received a massage determines authenticity of the received message not only by performing MAC verification but also by comparing a count value included in the message with the count value held in itself and properly discards the message. The communication system 1 is thus capable of eliminating a message by so-called a replay attack and hence capable of upgrading system security.

In the present embodiment, the management ECU 10k is furnished with functions as the normal ECUs 10n. Alternatively, the management ECU 10k may be formed as an ECU dedicated for synchronization processing by omitting the functions of the normal ECUs 10n.

2. Second Embodiment (2.1. Difference from the First Embodiment)

A second embodiment and the first embodiment above are same in fundamental configuration and only a difference will be described. Reference symbols same as reference symbols used in the first embodiment above denote same configurations, and reference should be made to the preceding description.

In the first embodiment above, the message count value Cme of the communication counter is updated each time a normal message is transmitted and received. The second embodiment is different from the first embodiment in that a message count value Cme is updated every regular update period (for example, every 1 ms) independently of whether a normal message is transmitted and received.

The following will describe processing by a transmission processing unit 141 and a reception processing unit 142 different from the processing in the first embodiment above.

(2.2. Transmission Processing Unit)

Figure 8:
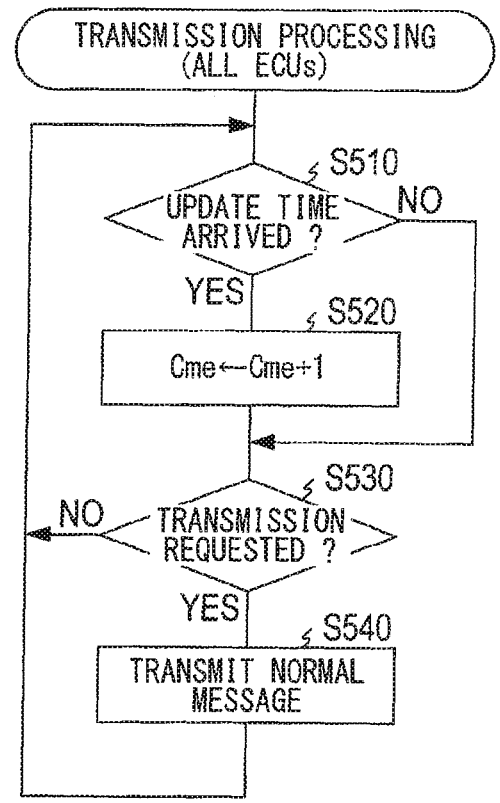
FIG. 8 is a flowchart depicting transmission processing according to a second embodiment.

Processing performed by the transmission processing unit 141 will be described using a flowchart of FIG. 8. The processing shown in FIG. 8 starts upon activation of a normal ECU.

When the processing starts, the transmission processing unit determines in S510 whether an update time, which is set for every preliminarily set regular update period, is arrived. When the update time arrives, the flow proceeds to S520. When the update time has not yet arrived, the flow skips to S530.

In S520, that is, when the update time arrives, the message count value Cme in a communication counter held in a count value holding unit 11 is incremented (Cme←Cme+1). The flow then proceeds to S530.

In S530, a determination is made as to whether a transmission request from a control unit 13 has been received. When the transmission request has been received, the flow proceeds to S540. When the transmission request has not been received, the flow returns to S510.

In S540, that is, when the transmission request has been received, a normal message is generated by using data PDU supplied from the control unit 13 and a count value of the communication counter held in the count value holding unit 11, and transmitted to a receiver ECU 10. The flow then returns to S510.

In short, in the present embodiment, the message count value Cme is updated at periodical update time independently of transmission of a message.

(2.3. Reception Processing Unit)

Figure 7:
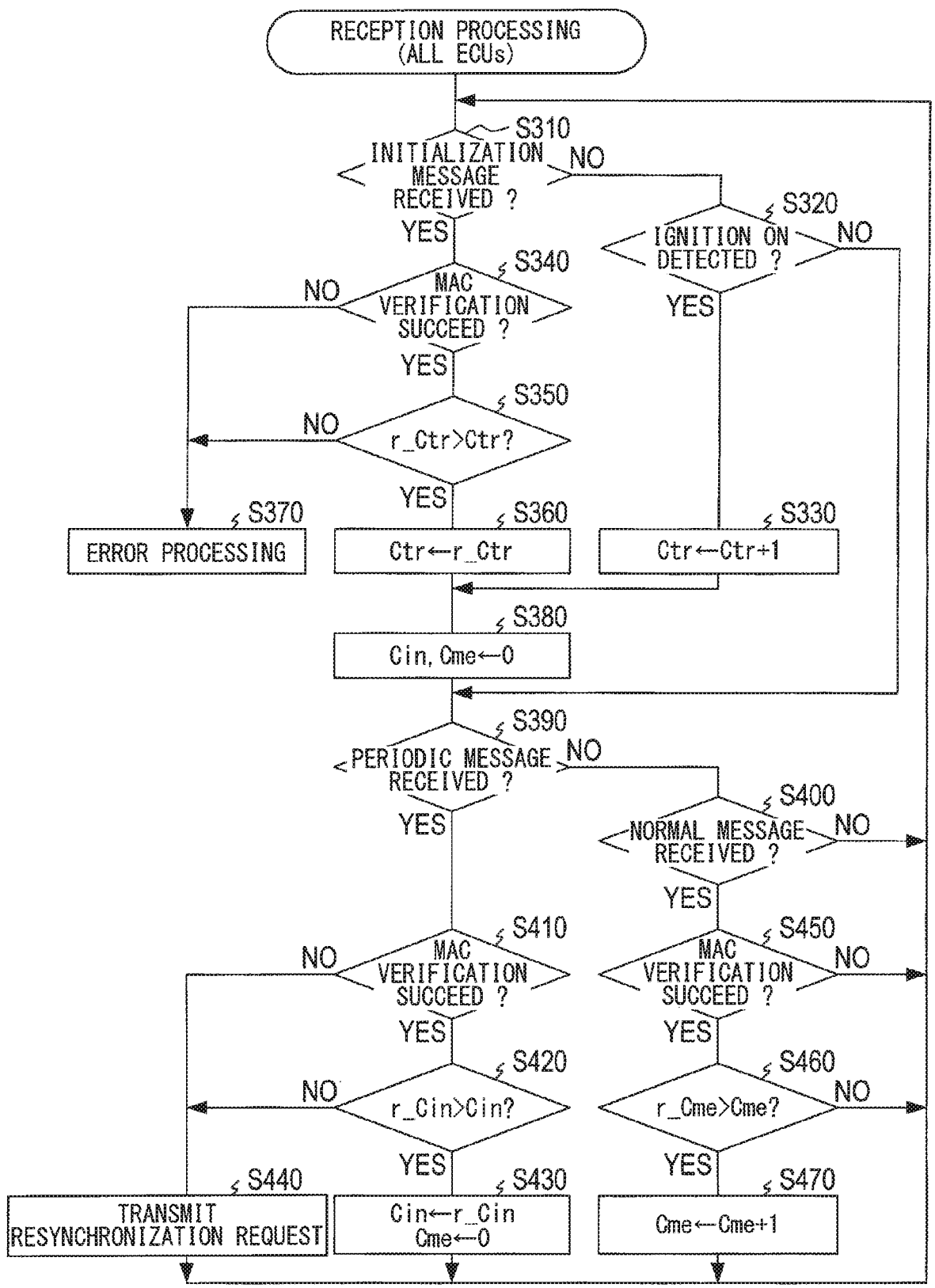
FIG. 7 is a flowchart depicting reception processing performed by the message processing unit in the normal ECU.
Figure 9:
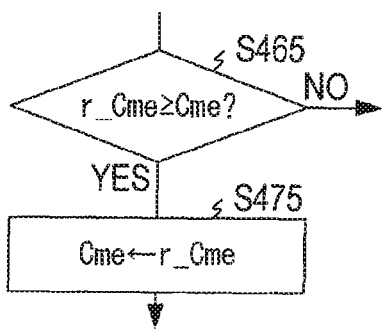
FIG. 9 is a flowchart of a changed portion in reception processing in the second embodiment.

Processing performed by the reception processing unit 142 is different from the processing in the first embodiment above only in that S465 and S475 of FIG. 9 are performed instead of S460 and S470 of the flowchart of FIG. 7, respectively.

That is, when a normal message is received and MAC verification succeeds, that is, when a positive determination is made in both S400 and S450, the flow proceeds to S465 shown in FIG. 9.

In S465, a determination is made as to whether a message count value r_Cme included in a CNT field of the normal message is equal to or greater than the message count value Cme of the communication counter held in the count value holding unit 11. When r_Cme≥Cme, the flow proceeds to S475. When r_Cme<Cme, the flow returns to S390.

In S475, the message count value Cme of the communication counter held in the count value holding unit 11 is updated to the message count value r_Cme included in the CNT field of the normal message (Cme←r_Cme). The flow then returns to S390.

The update period which determines the update time may be preferably set as long as or shorter than an average transmission interval of a normal message. That is, the message count value Cme is a clock period of a clock timer, which is updated every update time. In other words, a timestamp may be used as the message count value Cme.

(2.4. Effects)

According to the second embodiment described in detail as above, effects same as the effects of the first embodiment above can be obtained.

3. Third Embodiment (3.1. Difference from the First Embodiment)

A third embodiment and the first embodiment above are same in fundamental configuration and only a difference will be described. Reference symbols same as reference symbols used in the first embodiment above denote same configurations and reference should be made to the preceding description.

In the first embodiment above, when a periodic message is received and MAC verification is successful, the interval count value Cin is immediately rewritten to the interval count value r_Cin included in the periodic message. The third embodiment is different from the first embodiment above in that an interval count value r_Cin included in a periodic message is temporarily stored as a temporary value Cin_tmp, and an interval count value Cin is rewritten later to the temporary value Cin_tmp when MAC verification of a normal message performed by using the temporary value Cin_tmp is successful.

Figure 10:
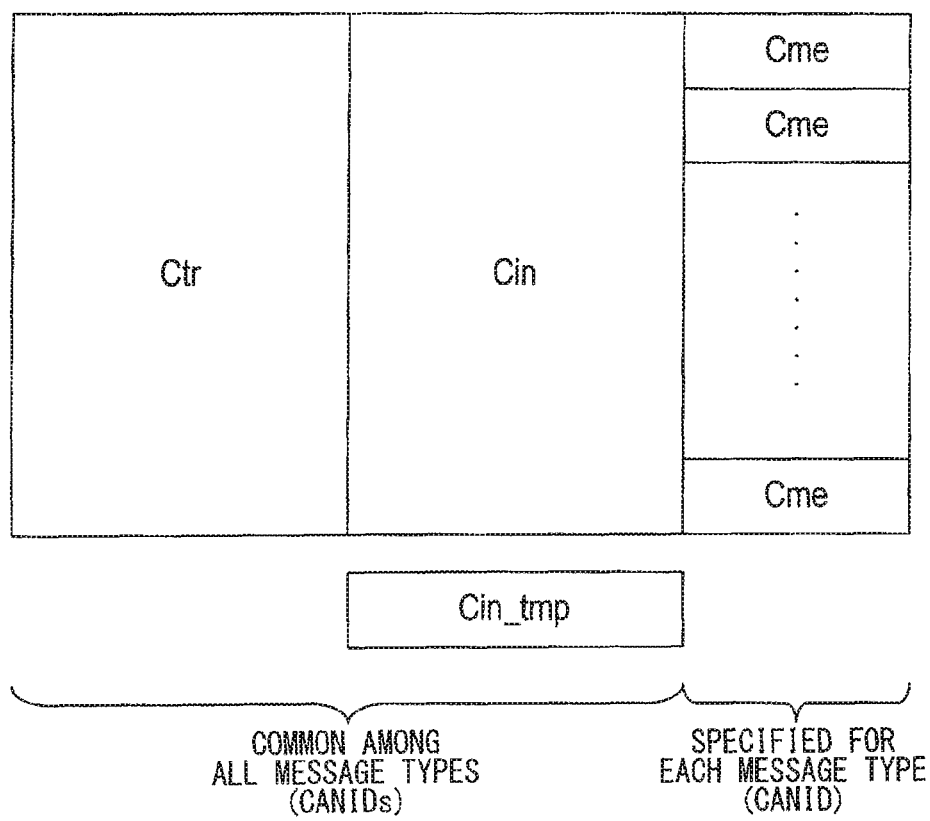
FIG. 10 is a diagram showing a structure of a counter managed by a normal ECU according to a third embodiment.

In the present embodiment, as is shown in FIG. 10, count value holding units 11k and 11n include a field which stores the temporary value Cin_tmp in addition to the configuration as the communication counter described in the first embodiment above.

(3.2. Processing)

Figure 11:
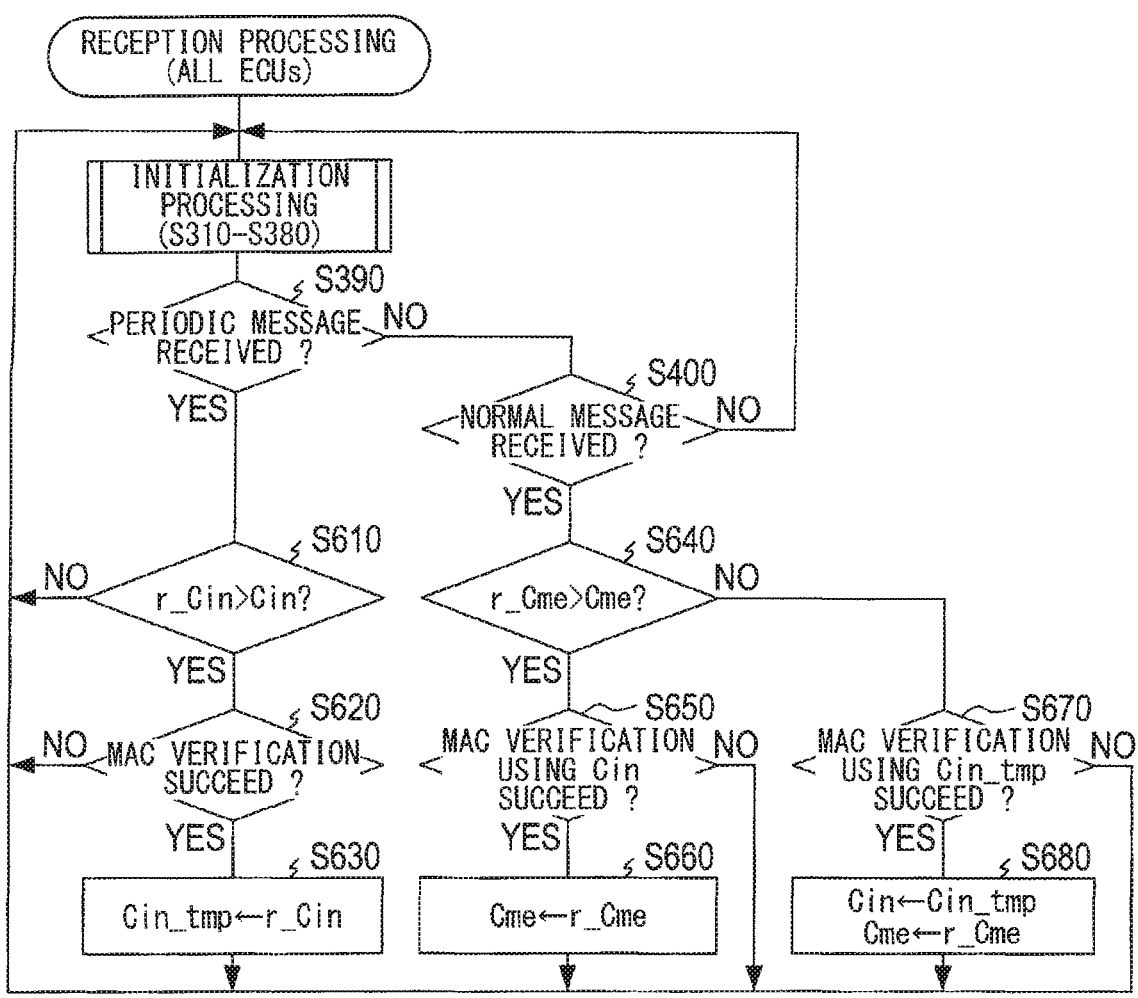
FIG. 11 is a flowchart depicting reception processing in the third embodiment.

Reception processing performed by a reception processing unit 142 instead of the reception processing of the first embodiment above depicted in FIG. 7 will be described using a flowchart of FIG. 11. Processing in S310 through S400 of FIG. 11 is same as the processing in S310 through S400 of FIG. 7, and will be described simply in part.

When the reception processing unit 142 determines in S390 that a periodic message has been received, the flow proceeds to S610.

In S610, a determination is made as to whether an interval count value r_Cin included in a DATA field of the periodic message is greater than an interval count value Cin of a communication counter held in a count value holding unit 11. When r_Cin>Cin, the flow proceeds to S620. When r_Cin≤Cin, the flow returns to S310.

In S620, a MAC is generated by using the interval count value r_Cin included in the DATA field of the received periodic message and a common key K held in a key holding unit 12, and MAC verification is performed by comparing the newly generated MAC with a value included in a MAC field of the periodic message. When the MAC verification fails, the flow returns to S310. When the MAC verification succeeds, the flow proceeds to S630.

In S630, the temporary value Cin_tmp of the communication counter held in the count value holding unit 11 is updated to the interval count value r_Cin included in the DATA field of the periodic message. The flow then returns to S310.

When the reception processing unit 142 determines in S400 that a normal message has been received, the flow proceeds to S640.

In S640, a determination is made as to whether a message count value r_Cme included in a CNT field of the normal message is greater than a message count value Cme of the communication counter held in the count value holding unit 11. It should be noted that the message count value Cme checked herein is a value which had been counted for a CANID of the received normal message. When r_Cme>Cme, the flow proceeds to S650. When r_Cme≤Cme, the flow proceeds to S670.

In S650, a MAC is generated by using data r_PDU included in a DATA field of the normal message, the common key K held in the key holding unit 12, and a count value CTr made up of a trip count value Ctr and an interval count value Cin of the communication counter held in the count value holding unit 11 and the message count value r_Cme included in the CNT field of the normal message and linked to the count values Ctr and Cin. Further, MAC verification is performed by comparing the newly generated MAC with a value included in a MAC field of the normal message. When the MAC verification fails, the flow returns to S310. When the MAC verification succeeds, the flow proceeds to S660.

In S660, the message count value Cme of the communication counter held in the count value holding unit 11 is updated to the message count value r_Cme included in the normal message. The flow then returns to S310 and the DATA field of the normal message is supplied to a control unit 13 as data PDU at a same time.

In S670, a MAC is generated by using the data r_PDU included in the DATA field of the normal message, the common key K held in the key holding unit 12, and a count value CTr made up of the trip count value Ctr and the temporary value Cin_tmp of the communication counter held in the count value holding unit 11 and the message count value r_Cme included in the CNT field of the normal message and linked to the count value Ctr and Cin_tmp. Further, MAC verification is performed by comparing the newly generated MAC with a value included in the MAC field of the normal message. When the MAC verification fails, the flow returns to S310. When the MAC verification succeeds, the flow proceeds to S680.

In S680, the interval count value Cin of the communication counter held in the count value holding unit 11 is updated to the temporary value Cin_tmp. Meanwhile, the message count value Cme of the communication counter held in the count value holding unit 11 is updated to the message count value r_Cme included in the CNT field of the normal message. The flow then returns to S310.

(3.3. Operation)

In the present embodiment, the interval count value r_Cin included in a periodic message is held in the count value holding unit 11 as the temporary value Cin_tmp each time a periodic message is properly received by the reception processing described above. In a case where a normal message is properly received, when the message count value r_Cme included in the normal message is greater than the message count value Cme held in the count value holding unit 11, that is, when r_Cme>Cme, it is determined that the interval count value Cin has not been updated at an end of the transmitter of the normal message, and MAC verification is performed by using the interval count value Cin held in the count value holding unit 11. Meanwhile, when r_Cme≤Cme, it is determined that the interval count value Cin has been updated at the end of the transmitter of the normal message, and MAC verification is performed by using the temporary value Cin_tmp held in the count value holding unit 11. When the MAC verification succeeds, the interval count value Cin is updated to the temporary value Cin_tmp.

(3.4. Effects)

According to the third embodiment described in detail as above, an effect as follows can be obtained in addition to the effects obtained by the first embodiment above.

In the present embodiment, even when update time of the interval count value Cin becomes later at the end of the transmitter of a communication message than at an end of the receiver for some reason, because the last interval count value Cin before being updated is held at the end of the receiver, the communication message can be verified by using the last interval count value Cin. Conversely, when update time of the interval count value Cin becomes later at the end of the receiver of a communication message than at the end of the transmitter, verification of the communication message fails. However, such a failing state can be immediately restored to a state in which a communication message is verified properly by receiving a periodic message.

4. Fourth Embodiment (4.1. Difference from the First Embodiment)

A fourth embodiment and the first embodiment above are same in fundamental configuration and only a difference will be described. Reference symbols same as reference symbols used in the first embodiment above denote same configurations and reference should be made to the preceding description.

In the first embodiment above, the management ECU 10*k* is furnished with functions of the normal ECUs 10*n*. In other words, one normal ECU is formed to function as the management ECU. The fourth embodiment is different from the first embodiment above in that a management ECU is not furnished with functions of normal ECUs.

(4.2. Overall Configuration)

Figure 12:
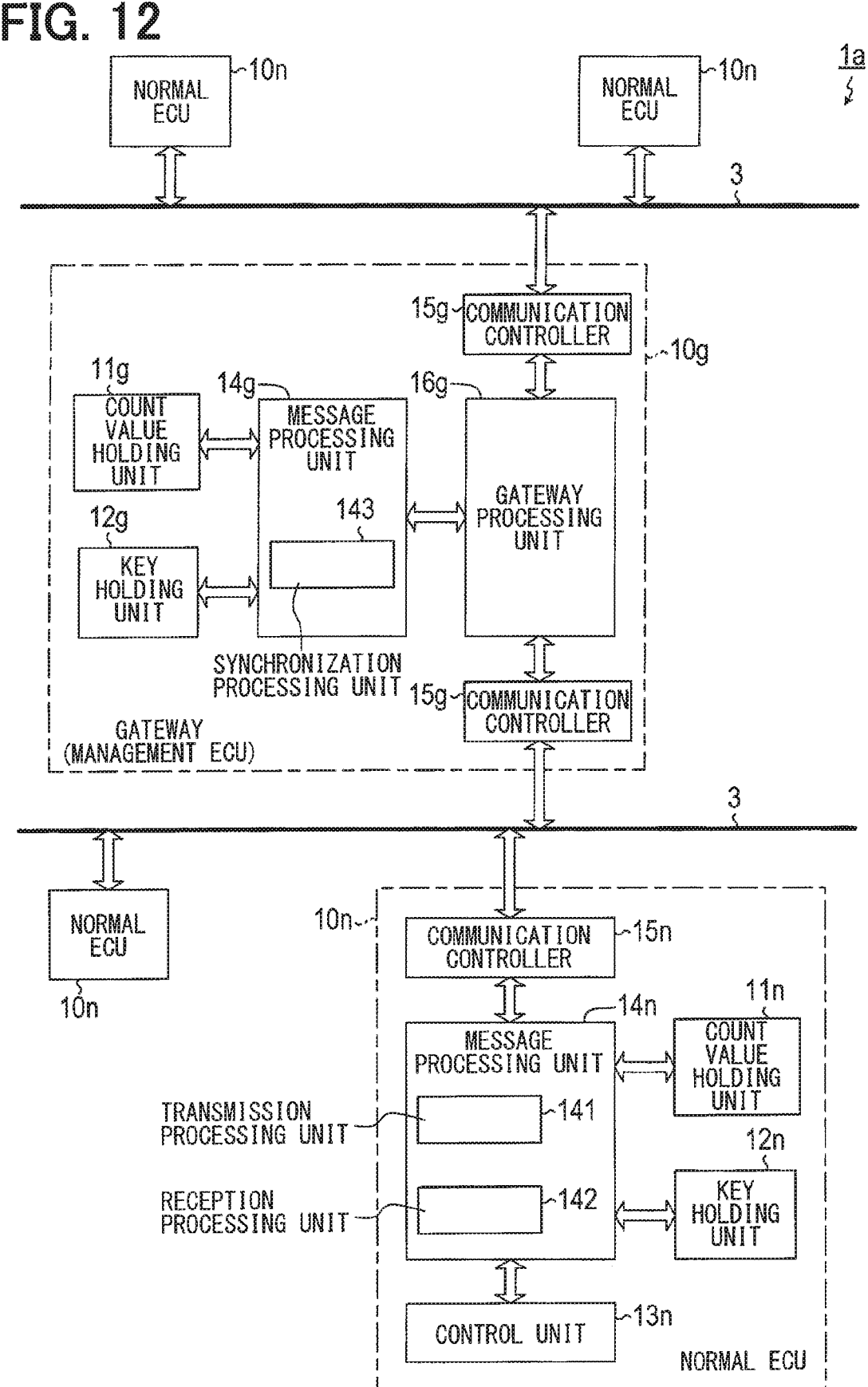
FIG. 12 is a block diagram of an overall configuration of a communication system according to a fourth embodiment.

A communication system 1*a* is mounted to a vehicle, and as is shown in FIG. 12, includes multiple bus communication channels 3, multiple nodes 10 each connected to one communication channel 3, and a gate way 10*a* interconnecting the communication channels 3.

The multiple nodes 10 are formed in a same manner as the normal ECUs 10*n* described in the first embodiment above. That is, the communication system 1*a* is configured in a same manner as the communication system 1 except that more than one communication channel 3 is provided and a gateway 10*g* is provided instead of the management ECU 10*k*.

(4.3. Gateway)

The gateway 10*g* includes a count value holding unit 11*g*, a key holding unit 12*g*, a message processing unit 14*g*, a communication controller 15*g*, and a gateway processing unit 16*g*.

The key holding unit 12*g* and the communication controller 15*g* are same, respectively, as the key holding unit 12*k* and the communication controller 15*k* described in the first embodiment above.

The gateway processing unit 16*g* is a known component which relays CAN frames by referring to CANIDs included in the CAN frames flowing the respective communication channels 3.

The count value holding unit 11*g* has at least one area available, in which to hold a count value of a management counter shown in FIG. 2.

The message processing unit 14*g* includes a synchronization processing unit 143.

That is, the count value holding unit 11*g* and the message processing unit 14*g* are formed by omitting functions of normal ECUs 10*n* from the count value holding unit 11*k* and the message processing unit 14*k* described in the first embodiment above.

(4.4. Effects)

According to the fourth embodiment described in detail as above, effects same as the effects of the first embodiment above can be obtained.

5. Other Embodiments

While the above has described the embodiments of the present disclosure by way of example, embodiments are not limited to the embodiments described above.

(1) In the embodiments above, a common key K prepared beforehand is used in generation of MAC. Alternatively, a common key K generated by using a count value (Ctr and Cin) of a management counter may be used instead. For example, in a case where a common key K is generated each time a trip count value Ctr is updated, a management ECU 10*k* may generate a common key K each time S120 of FIG. 5 is performed, and ECUs 10 having communication counters may generate a common key K each time S330 or S360 of FIG. 7 is performed. In a case where a common key K is generated each time an interval count value Cin is updated, the management ECU 10*k* may generate a common key K each time S160 of FIG. 5 is performed, and ECUs having communication counters may generate a common key K each time S380 or S430 of FIG. 7 is performed.

(2) In the embodiments above, the trip count value Ctr and the interval count value Cin are used as the high-order count value. Alternatively, a timestamp may be used as a high-order count value, either entirely or in part. In such a case, a high-order update condition is an arrival of a clock time at which a clock counter used for a timestamp is updated. Resynchronization time used as a distribution condition of the high-order count value may be set to arrive in every predetermined period longer than a period of the clock time.

(3) In the embodiments above, a whole message count value Cme is stored in the CNT field of a normal message. Alternatively, only a part of the message count value Cme, for example, only a low-order part of a predetermined number of digits may be stored.

(4) In the embodiments above, the count value holding unit 11*k* of the management node 10*k* is formed of a non-volatile memory whereas the count value holding units 11*n* of the normal ECUs 10*n* are not necessarily formed of non-volatile memories. Alternatively, the count value holding units 11*n* may be also formed of non-volatile memories. In such a case, for example, in the event of an instantaneous interruption of a power supply, a communication can be continued without having to resynchronize the count values because the count values once stored in the count value holding units 11*n* are not erased.

(5) In the third embodiment above, a normal message is not properly received when the interval count value Cin is updated at the receiver's end with a delay. Alternatively, the configuration may be modified as follows. That is, when a negative determination is made in S670, MAC verification is performed by using a next value p_Cin which is a value obtained by incrementing the interval count value Cin.

When the MAC verification succeeds, MAC verification of a communication message may be performed by continuously using the next value p_Cin until a periodic message is received.

(6) Multiple functions furnished to a single component in the embodiments above may be realized by multiple components or one function furnished to a single component may be realized by multiple components. Multiple functions furnished to multiple components may be realized by a single component or one function realized by multiple components may be realized by a single component. Configurations of the embodiments above may be omitted in part. At least a part of the configurations of the embodiments above may be added to or replaced with the configuration of any other embodiment.

The invention claimed is:

1. A communication system for counter synchronization comprising:
   a plurality of nodes that are interconnected, each of the plurality of nodes generates a message authentication code (MAC) with a count value of an own counter and verifies a message transceived among the plurality of nodes using the message authentication code,
   wherein
   the plurality of nodes include a management node and normal nodes,
   a normal node from among the normal nodes transmits and receives the message,
   wherein the count value of the counter in each of the plurality of nodes is divided into two segments, one segment on a high order side is defined as a high-order count value and a remaining segment on a low order side is defined as a low-order count value,
   wherein the message transceived among the normal nodes and including the low-order count value is defined as a normal message,
   the management node is configured to manage a synchronization in count values of counters of the normal nodes, and includes:
      memory;
      a high-order count value holding unit holding the high-order count value;
      a high-order count value update unit stored in the memory and configured for updating the high-order count value based on a preliminarily set high-order update condition; and
      a high-order count value distribution unit stored in the memory and configured for distributing the high-order count value held in the high-order count value holding unit to the normal node based on a preliminarily set distribution condition using a message for update purpose, the message for update purpose is different from the normal message, and
   the normal node includes:
      memory;
      a count value holding unit holding the count value;
      a low-order update unit stored in the memory and configured for updating the low-order count value held in the count value holding unit based on a preliminarily set low-order update condition;
      a high-order update unit stored in the memory and configured for updating the high-order count value held in the count value holding unit with the high-order count value distributed from the management node with reference to the message for update purpose; and
      a low-order initialization unit stored in the memory and configured for initializing the low-order count value with a predetermined reset value when the high-order count value is updated by the high-order update unit.

2. The communication system according to claim 1, wherein
   the high-order update unit of the normal node includes:
      a temporary holding unit comprising memory for temporarily holding the high-order count value distributed from the management node using the message for update purpose; and
      an update reflection unit stored in the normal node and configured for updating the high-order count value held in the count value holding unit to the high-order count value held in the temporary holding unit when a verification of the normal message is successful, and
   the verification of the normal message is performed using the message authentication code which is generated with the high-order count value temporarily held in the temporary holding unit.

3. The communication system according to claim 1, wherein
   the high-order update condition is at least one of a detection of a power supply start or an arrival of a resynchronization time which is set for every predetermined period, and
   the distribution condition is same as the high-order update condition.

4. The communication system according to claim 1, wherein
   the high-order update condition is an arrival of a clock time which is set for every predetermined clock period,
   the distribution condition is an arrival of a resynchronization time which is set for every predetermined period, and
   the predetermined period is longer than the predetermined clock period.

5. The communication system according to claim 1, wherein
   the management node manages the high-order count value by dividing the high-order count value into a plurality of segments, and
   the high-order update condition applied to each divided segment of the high-order count value is different from one another.

6. The communication system according to claim 1, wherein
   the normal node sets the low-order update condition as a detection of a transmission or a reception of the normal message.

7. The communication system according to claim 1, wherein
   the normal node sets the low-order update condition as an arrival of an update time which is set for every predetermined period.

8. The communication system according to claim 1, wherein
   each of the plurality of nodes uses a preliminarily set common key when generating the message authentication code.

9. The communication system according to claim 8, wherein
   the common key is generated with the high-order count value that is updated in response to each update of the high-order count value.

10. The communication system according to claim 8, wherein
the common key is generated with the high-order count value that is distributed in response to each distribution of the high-order count value.

11. The communication system according to claim 1, wherein
the normal node includes the low-order count value held in the normal node in the normal message that is to be transmitted, and
when receiving the normal message, the normal node determines an authenticity of the normal message by comparing the low-order count value held in the normal node with the low-order count value included in the normal message.

12. The communication system according to claim 1, wherein,
when the management node distributes the high-order count value using the message for update purpose, the management node ensures an integrity of the message for update purpose, which includes the high-order count value, using the message authentication code.

13. A management node in a communication system for counter synchronization,
wherein
a plurality of nodes that are interconnected with the management node transceive a message,
each of the plurality of nodes including the management node and normal nodes generates a message authentication code (MAC) with a count value of an own counter and verifies the message using the message authentication code,
the management node transmits the message authentication code to the normal nodes,
the management node manages a synchronization in count values of counters of the normal nodes, and
the normal nodes transceive the message in the communication system and authenticates the message transceived among the normal nodes with the message authentication code, and the message transceived among the normal nodes is defined as a normal message,
the management node comprising:
memory;
a high-order count value holding unit holding a high-order count value, wherein, the count value of the own counter in the management node is divided into two segments, one segment on a high-order side is defined as the high-order count value and a remaining segment on a low-order side is defined as a low-order count value;
a high-order count value update unit stored in the memory and configured for updating the high-order count value based on a preliminarily set high-order update condition; and
a high-order count value distribution unit stored in the memory and configured for distributing the high-order count value held in the high-order count value holding unit to the normal nodes based on a preliminarily set distribution condition using a message for update purpose, the message for update purpose being different from the normal message,
wherein the message for update purpose is used for updating high-order count values with the distributed high-order count value and for initializing the low-order count value with a predetermined reset value, in the normal nodes.

14. A normal node in a communication system for counter synchronization, wherein the normal node from among a plurality of normal nodes interconnected with a management node receives a message authentication code (MAC) generated with a count value of a counter of the management node and verifies a message transceived among the plurality of the normal nodes, the normal node comprising:
memory;
a count value holding unit holding a count value of a counter;
a low-order update unit stored in the memory and configured for updating a low-order count value held in the count value holding unit according to a preliminarily set low-order update condition, wherein, the count value is divided into two segments, one segment on a high order side is defined as a high-order count value and a remaining segment on a low order side is defined as the low-order count value, the message transceived among the plurality of the normal nodes and including the low-order count value is defined as a normal message;
a high-order update unit stored in the memory and configured for updating the high-order count value held in the count value holding unit with a high-order count value distributed from the management node using a message for update purpose, a preliminarily set high-order update condition, wherein the message for update purpose is different from the normal message, and the management node is configured to manage a synchronization of the count value of the counter in the normal node with another normal node; and
a low-order initialization unit stored in the memory and configured for initializing the low-order count value with a predetermined reset value when the high-order count value is updated by the high-order update unit using the high-order count value distributed from the management node.

15. A counter synchronization method applied to a communication system, wherein
the communication system includes a plurality of nodes that are interconnected, each of the plurality of nodes generates a message authentication code (MAC) with a count value of an own counter and verifies a message transceived among the plurality of nodes using the generated message authentication code, the plurality of nodes include normal nodes that transceive the message and a management node that manages synchronization of count values of counters included in the normal nodes,
the counter synchronization method comprising:
dividing the count value of the counter of each of the plurality of nodes into two segments, wherein one segment on a high order side is defined as a high-order count value and a remaining one segment on a low order side is defined as a low-order count value, wherein the message transceived among the normal nodes and including the low-order count value is defined as a normal message;
holding, in the management node, the high-order count value of the management node;
updating, in the management node, the high-order count value of the management node based on a preliminarily set high-order update condition;
distributing the high-order count value updated in the management node to the normal nodes based on a preliminarily set distribution condition using a message for update purpose, wherein the message for update purpose is different from the normal message;

holding, in each of the normal nodes, the count value of each of the normal nodes;

updating, in each of the normal nodes, the low-order count value of each of the normal nodes based on a preliminarily set low-order update condition;

updating, in each of the normal nodes, the high-order count value with the high-order count value distributed from the management node using the message for update purpose, a preliminarily set high-order update condition; and initializing, in each of the normal nodes, the low-order count value with a predetermined reset value when the high-order count value is updated.

16. A computer-readable non-transitory tangible storage medium storing a program in a communication system for counter synchronization that when executed, causes computing units in the communication system to:

transceive a message among a plurality of nodes including a management node and normal nodes that are interconnected;

cause each of the plurality of nodes to generate a message authentication code (MAC) with a count value of an own counter and verify the message using the message authentication code;

cause the management node to transmit the message authentication code to the normal nodes, wherein the management node is caused to manage a synchronization in count values of counters of the normal nodes;

cause the normal node to transceive the message in the communication system and authenticate the message transceived among the normal nodes with the message authentication code, wherein the message transceived among the normal nodes is defined as a normal message;

cause the management node to hold a high-order count value, wherein, the count value of the own counter in the management node is divided into two segments, one segment on a high-order side is defined as the high-order count value and a remaining segment on a low-order side is defined as a low-order count value;

cause the management node to update the high-order count value based on a preliminarily set high-order update condition; and cause the management node to distribute the high-order count value held in the management node to the normal nodes based on a preliminarily set distribution condition using a message for update purpose, the message for update purpose being different from the normal message, wherein the message for update purpose is used for updating high-order count values with the distributed high-order count value and for initializing the low-order count value with a predetermined reset value, in the normal nodes.

17. A computer-readable non-transitory tangible storage medium storing a program in a communication system for counter synchronization that when executed, causes computers in the communication system to:

receive, at a normal node from among a plurality of normal nodes interconnected with a management node, a message authentication code (MAC) generated with a count value of a counter of the management node and verify a message transceived among the plurality of normal nodes;

cause the normal node to hold a count value of a counter in the normal node;

cause the normal node to update a low-order count value held in the normal node according to a preliminarily set low-order update condition, wherein, the count value is divided into two segments, one segment on a high order side is defined as a high-order count value and a remaining segment on a low order side is defined as the low-order count value, wherein the message transceived among the plurality of the normal nodes and including the low-order count value is defined as a normal message;

cause the normal node to update the high-order count value held in the normal node with a high-order count value distributed from the management node using a message for update purpose, a preliminarily set high-order update condition, wherein the message for update purpose is different from the normal message, and the management node is caused to manage a synchronization of the count value of the counter in the normal node with another normal node; and cause the normal node to initialize the low-order count value with a predetermined reset value when the high-order count value is updated in the normal node using the high-order count value distributed from the management node.

18. The communication system according to claim 1, wherein the high-order count value comprises a trip count value and an interval count value, and the low-order count value comprises a message count value.

19. The communication system according to claim 1, wherein only the high-order count value is sent for updating by the management node to the normal node.

* * * * *